Figure 2:
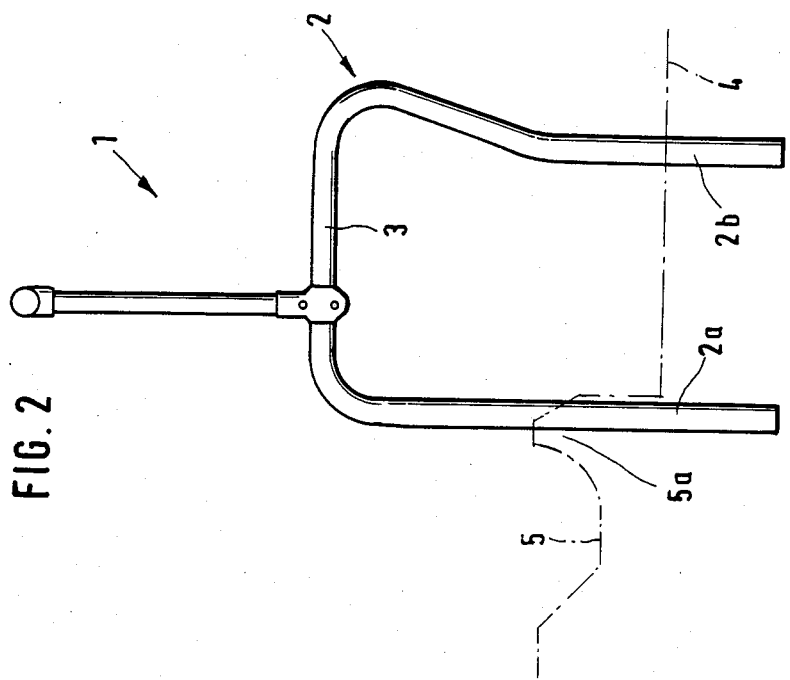

United States Patent [19]

Osthoff

[11] Patent Number: 4,649,864
[45] Date of Patent: Mar. 17, 1987

[54] DEVICE FOR KEEPING ANIMALS SEPARATED AND TIED UP IN STALLS

[76] Inventor: Heinz Osthoff, Innstr. 24a, D-8260 Mühldorf/Inn, Fed. Rep. of Germany

[21] Appl. No.: 656,242

[22] Filed: Oct. 1, 1984

[30] Foreign Application Priority Data

Apr. 11, 1984 [DE] Fed. Rep. of Germany ....... 3413653

[51] Int. Cl.⁴ ............................................... A01K 1/12
[52] U.S. Cl. ..................................................... 119/27
[58] Field of Search ................... 119/27; 403/208, 211, 403/234, 237

[56] References Cited

U.S. PATENT DOCUMENTS

| 1,225,320 | 5/1917 | Ferris | 403/233 X |
| 1,261,213 | 4/1918 | Clay | 403/233 |
| 1,262,731 | 4/1918 | Young | 119/27 |
| 1,589,226 | 6/1926 | Regan et al. | 119/27 |
| 1,839,313 | 1/1932 | Hibbs et al. | 119/27 |
| 1,874,598 | 8/1932 | Olson | 119/27 |

FOREIGN PATENT DOCUMENTS 2751963 5/1979 Fed. Rep. of Germany ........ 119/27
2923384 12/1980 Fed. Rep. of Germany .
8025860 1/1981 Fed. Rep. of Germany .

Primary Examiner—Robert P. Swiatek
Attorney, Agent, or Firm—Fleit, Jacobson, Cohn & Price

[57] ABSTRACT

A separating device for keeping animals tied up in stalls, the device including a separating frame shaped in U-form, which is connected to a cross bar by a supporting device for tieing up the animal, characterized in that the two legs of the U-shaped separating frame are serving the purpose of anchoring the separating frame in the floor of the stable, and that the supporting device for the crossbar is movably connected by its lower end to the frame section connecting the two legs of the U-shaped separating frame.

7 Claims, 6 Drawing Figures

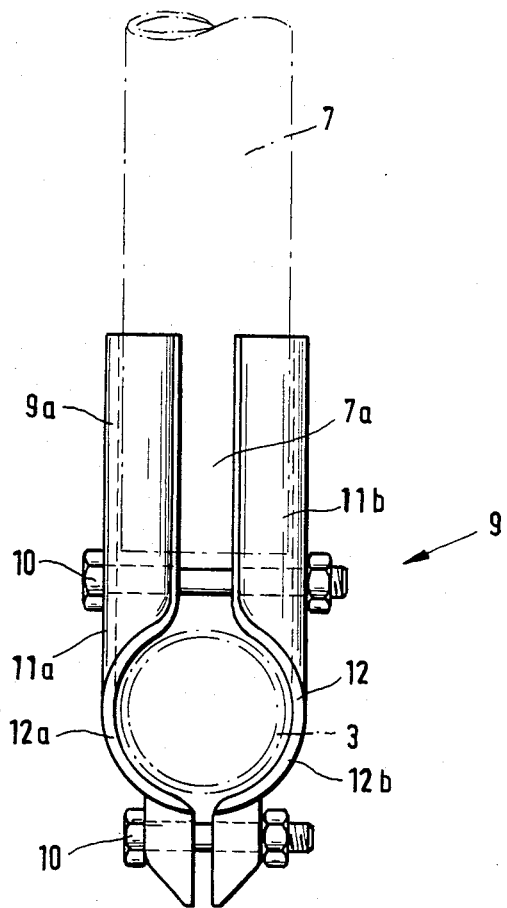

DEVICE FOR KEEPING ANIMALS SEPARATED AND TIED UP IN STALLS

This invention relates to a device for keeping animals separated and tied up in stalls. The device comprises a separating frame, which is U-shaped and which is connected to a supporting device for a crossbar serving the purpose of tieing up the animal.

A device used for limiting a cattle stall on the side, the limiting element being embodied in the form of a tube (pipe) bent in the shape of a hairpin. The ends of the bent tube are each welded to a vertical pipe anchored in the area of the head of the animal tied up in the cattle stall. The welding is located above the back of an animal reasting on the ground. A supporting device connects the limiting element to a cross pipe serving the purpose of tieing up the animal. A belt is stretched from the limiting element to the floor of the stable for limiting the room required by the animal resting on the ground, sideways.

The known limiting device is primarily provided for such stalls to enable the animals to eat and to rest, where the animals are elastically supported in the area of their haunch, when they lie down. The known device cannot be utilized in stables equipped with short stalls.

Short stalls comprising curved separating frames for keeping cattle within the stalls are also known. There, the one separating frame is welded to a column anchored in the floor of the stable within the area of the manger, adequately spaced above the floor of the stable. The other end of the separating frame is installed into the floor of the stable at a distance from said column as specified by the separating frame. The measurements of this limiting element for cattle stalls are definitely specified by said column and by the separating frame being welded to said column.

Both known limiting devices for the lateral boundary of cattle stalls are expensive to install because of the welding necessary between the column and said separating frame. Because of these solid connections, said devices cannot be adjusted anymore to adapt same to individual needs, which require changes as to the location within the stable.

The problem of this invention is to provide a separating device for keeping animals tied up in stables, the individual parts of said device being simple as to the preparation of same and as to the assembly required. Besides this, they must be easily adaptable to different tieing systems and they must be adjustable to local requirements. Therefore, the individual parts must be detachable.

As to the invention, this problem is solved in that the two legs of the U-shaped separating frame are serving the purpose of anchoring the separating frame in the floor of the stable, and the supporting device for the crossbar is shiftably connected by means of its lower end to the section of the frame, which connects the two legs of the U-shaped separating frame.

The preparation of said separating frame is very simple as to the production processes required. Only a pipe of a specified thickness needs to be bent. There are no welding procedures required. As to the installation of the separating frame, the advantage is evident that same frame can be adapted to the customer's specifications, even if the arc has been preset, and that said frame can be anchored to the floor of the stable corresponding to local requirements. Thus, the same separating frame can be used for installation in front of or behind the bar. Moreover, the separating frame can be adapted in a simple way to different known tieing systems by means of a variable design of the arc (bend).

The multiform adaptability of the separating device as to the invention is particularly to be seen in that the supporting device for the crossbar is not welded with its lower end to the section of the frame connecting the two legs of the U-shaped separating frame but that same is shiftably fastened instead.

Thus, for instance, the separating device of the invention can be used, without difficulty, in cattle stalls equipped with uniform lines of a milking system and with cow training harnesses by means of the shiftability of the supporting device along the corresponding separating frame section, where the possibility exists the supporting tube vertically upward in a specified area of the cattle stall.

The production of individual parts of the separating device is very simple in connection with the construction design of the invention. No welding is necessary, at all. So, production procedures expensive as to costs and labor/time involved can be avoided. At the same time, the advantage of obtaining a device being variable in every respect by means of a most simple assembly is on hand and said device can be adapted to different requirements at less expense, if the stable concerned has to be remodelled or if alterations have to be made eventually.

In order to obtain the desired stiftability of the supporting device, said device is preferably fastened in a bracket. Said bracket is movable along the separating frame and may be formed by two halves of the bracket supplementing each other, if necessary. This bracket can be fastened by means of screws to the parts concerned in order to fix the connection between the supporting device and the separating frame.

Further features advantageous for the separating device of the invention are listed in the claims and in the following description of examples of embodiment and-/or can be derived therefrom and from the drawing.

Figure 1:
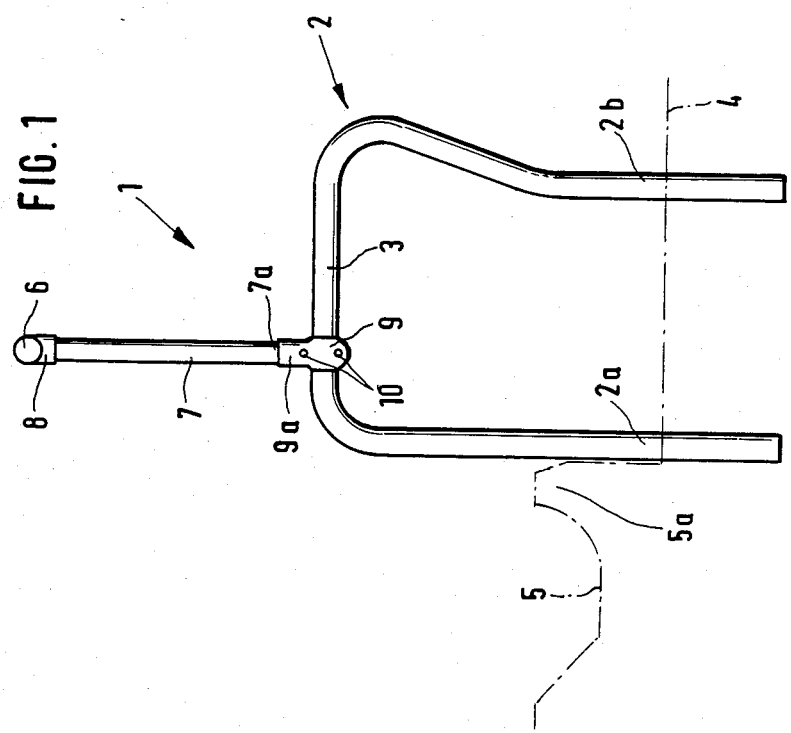
Figure 4:
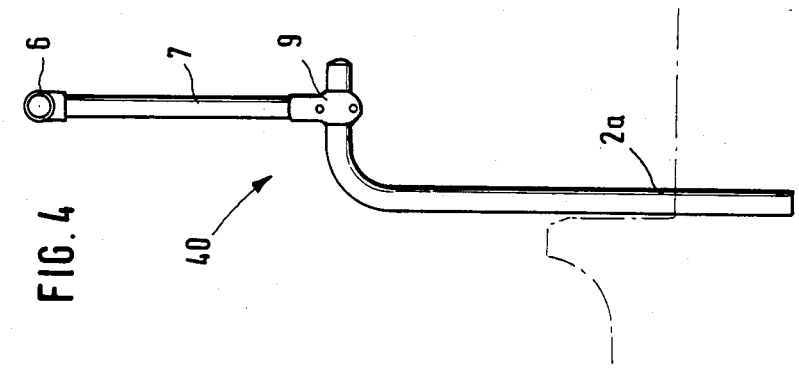
Figure 3:
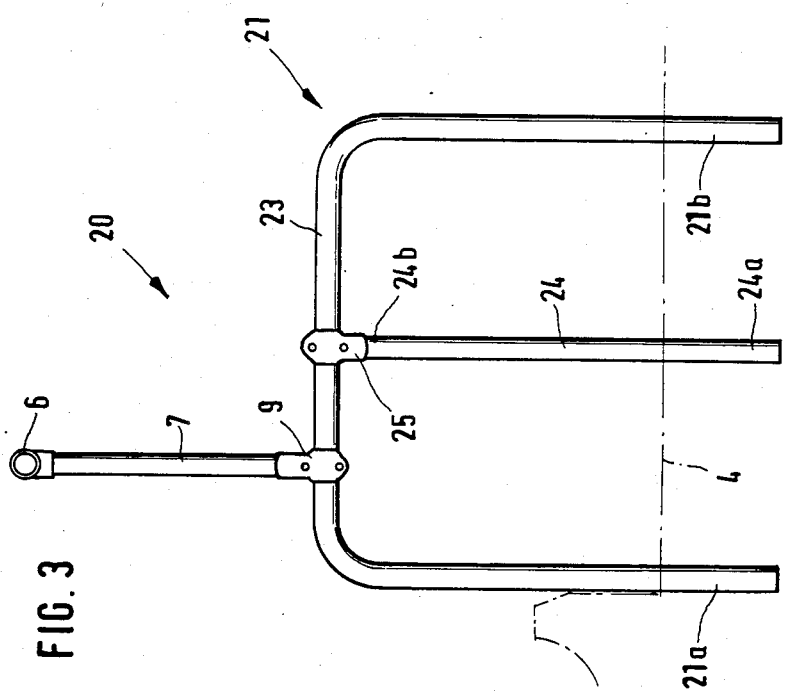
Figure 6:
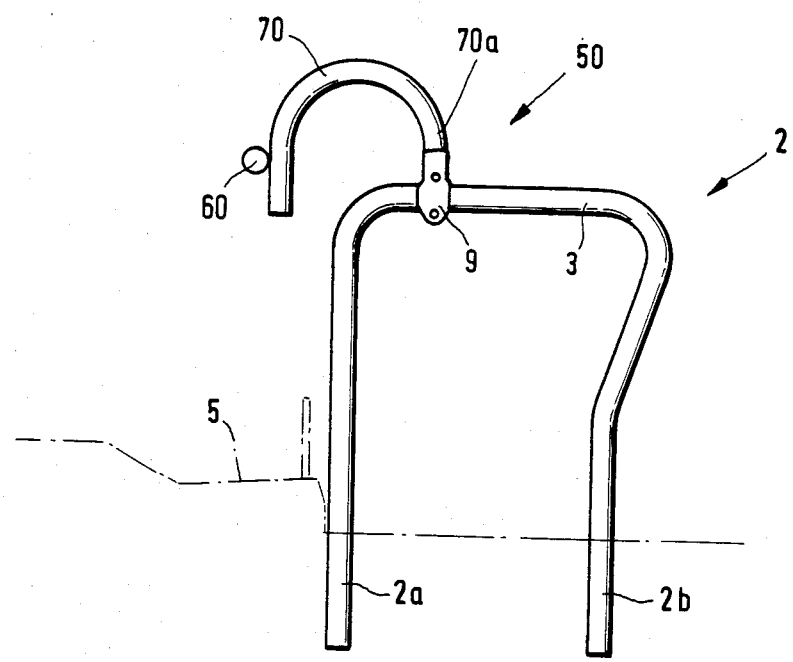

With regard to the drawings:

FIG. 1 illustrates a separating device arranged behind the wall of the bar of a feeding trough, FIG. 2 illustrates a separating device installed into the wall of the bar of a feeding trough, FIG. 3 illustrates a separating device with a center support, FIG. 4 illustrates a separating device with a separating frame cut off, FIG. 5 illustrates a sectional view of a connecting bracket for joining the separating frame and supporting device or center column respectively, and FIG. 6 illustrates a separating device for a particular cattle stall.

Corresponding parts of the devices are marked by coinciding reference numerals in the following text.

A separating device (1) shown in FIG. 1 is serving the purpose of keeping animals tied up in stalls located side-by-side. The separating device (1) comprises a separating frame (2), which is substantially U-shaped and the two legs (2a, 2b) which are extending parallel to each other being anchored in the floor (4) of the stable. The separating frame shown in the example extends from its leg (2a) projecting vertically in an upward direction to the other vertical leg (2b) being curved in its upper section towards the rear end of the cattle stall via a frame section (3) extending substantially horizontally. The leg (2a) is installed into the floor (4) of the stable immediately adjacent to a bar wall (5a) of a feeding trough (5).

A vertical pipe (7) is movably fastened by means of a bracket (8) to a crosspipe (6) extending above the heads of the animals tied up in the stalls in each case for the different separating frames (2) arranged side-by-side. The pipe (7) serves the purpose of a supporting device for the cross pipe (6), to which the individual animals are tied. The supporting device (7) is installed with its lower end (7a) projecting into an upward projecting extension (9a) of a bracket (9), which is movable along the separating frame (2). The bracket (9) embraces the horizontally extending section (3) of the separating frame and said bracket is fastened at a suitable spot of the section (3), here exactly below the bracket (8) fastened to the cross pipe (6), by means of screws (10) thereto.

The separating frame (2) and the supporting device (7) are bent and cut to the size of pipe material of the same strength, namely 2" pipes.

The bracket (9), see FIG. 5, illustrates two pipe shells (11a, 11b) of a semi-circular cross-section at its end (9a), said shells supplementing each other by means of screws (10) to form a pipe extension embracing almost completely the pipe end (7a) of the supporting device (7). The pipe shells (11a, 11b) are enlarged at one of their ends (12), so that they form two semi-circular shells (12a, 12b), their shaft extending vertically to the shaft of the pipe shells (11a, 11b). The pipe shells (12, 12b) embracing almost completely the pipe section (3) of the separating frame (2) form the bracket (9) movable along the separating frame. The pipe shells (12a, 12b) are fastened by means of screws (10) at a spot of the frame section (3) selected as being suitable.

A separating device (1) is shown in FIG. 2. Said device agrees completely with the device shown in the FIG. 1. The only difference is that this device is installed into the bar wall (5a), i.e. the leg (2a) penetrates the bar wall (5a).

An embodiment of a separating device (20) is shown in FIG. 3. Here, the horizontally extending section (23) of the separating frame (21) connecting the two legs (21a) and (21b) is longer than the horizontally extending section shown with the separating device (1) according to FIGS. 1 and 2. As a rule, such a separating device (20) is installed as a final stall in a row of stalls for tieing up animals in order to prevent an animal standing in the passway to block the passage for an operator.

The supporting device (7) as described in connection with FIGS. 1 and 2 is fixed in the front area of section 23 of the separating frame 21 by means of the bracket (9) and said device is connected to the cross pipe (6).

A center column 24 is located between the two vertically extending legs (21a) and (21b). Said column is extending parallel to said two legs and it is anchored by means of its one end (24a) in the floor (4) of the stable. The upper end (24b) of said column is secured to the section (23) of the separating frame (21) by means of the bracket (25), which is the same as the bracket (9).

The leg (2b) of a complete separating frame (2) may be cut off, if the installation of said frame in the stable requires this and if the user prefers this. Such an embodiment of a separating frame (40) is shown in FIG. 4.

The supporting device (70) is embodied in the form of an arc in a particular animal stall (50) and it extends from the spot, where it is connected in the shell (9), across the head of the animal and above the feeding trough (5). It is connected to the cross pipe (60) extending above the feeding trough (5), also.

I claim:

1. A separating device for keeping animals separated and tied up in stalls, said separating device comprising:
   a single piece, continuous U-shaped separating frame defining a sidewall of a stall, said separating frame adapted to be anchored in a floor of a stable and said separating frame consisting of two legs interconnected by a single horizontal crosspiece,
   a supporting device having two ends and being movably mounted at one of its ends on said crosspiece and being movable along substantially the entire horizontal extent of said crosspiece, and
   a crossbar mounted on the other end of said supporting device and extending between adjacently spaced separating frames defining a space for keeping an animal and said crossbar being connected to the head of the animal.

2. A separating device according to claim 1, wherein said supporting device is movably mounted on the separating frame by a bracket formed by two halves shaped complementary to each other.

3. A separating device according to claim 2, wherein a bracket extends about an upper end of a center support which supports said crosspiece, said center support anchors said U-shaped frame in the floor of the stable.

4. A separating device according to claim 3, wherein said supporting device and said center support are detachably connected to said separating frame.

5. A separating device according to claim 1, wherein said supporting device extends vertically in an upward direction from said U-shaped separating frame, and said supporting device is connected by means of its upper end to the crossbar.

6. A separating device according to claim 1, wherein said supporting device projects from said U-shaped separating frame, with a free end of said supporting device connected to a front end of a stall and said supporting device is connected to the crossbar extending substantially at the same height as a head of an animal tied up.

7. A separating device according to claim 1, wherein said U-shaped separating frame and said supporting device are made of pipes of the same diameter.

* * * * *